(12) United States Patent
Mason et al.

(10) Patent No.: US 12,314,458 B2
(45) Date of Patent: May 27, 2025

(54) UNOBTRUSIVE AUTHENTICATION SYSTEM

(71) Applicants: Jeremiah Mason, Lynn, MA (US); Paul Oramasionwu, Somerville, MA (US); Pieter-Jan Boone, Bedford, MA (US)

(72) Inventors: Jeremiah Mason, Lynn, MA (US); Paul Oramasionwu, Somerville, MA (US); Pieter-Jan Boone, Bedford, MA (US)

(73) Assignee: IMPRIVATA, INC., Waltham, MA (US)

( * ) Notice: Subject to any disclaimer, the term of this patent is extended or adjusted under 35 U.S.C. 154(b) by 425 days.

(21) Appl. No.: 17/469,735

(22) Filed: Sep. 8, 2021

(65) Prior Publication Data

US 2022/0083699 A1 Mar. 17, 2022

Related U.S. Application Data

(60) Provisional application No. 63/078,590, filed on Sep. 15, 2020.

(51) Int. Cl.
| | | |
|---|---|---|
| *H04L 29/06* | (2006.01) | |
| *G06F 21/31* | (2013.01) | |
| *G06F 21/62* | (2013.01) | |
| *G06F 21/83* | (2013.01) | |

(52) U.S. Cl.
CPC ............. *G06F 21/83* (2013.01); *G06F 21/31* (2013.01); *G06F 21/6245* (2013.01); *G06F 2221/2125* (2013.01); *G06F 2221/2137* (2013.01)

(58) Field of Classification Search
CPC ....... G06F 21/83; G06F 21/31; G06F 21/6245
See application file for complete search history.

(56) References Cited

U.S. PATENT DOCUMENTS

| | | | |
|---|---|---|---|
| 3,672,269 A | 6/1972 | Tabankin | |
| 4,525,047 A | 6/1985 | Myers | |
| 5,546,071 A | 8/1996 | Zdunich | |
| 2015/0207971 A1* | 7/2015 | Enomoto | G03B 7/00 348/143 |
| 2017/0103643 A1* | 4/2017 | Powers, III | E05G 1/00 |
| 2017/0171177 A1* | 6/2017 | Eramian | G06F 18/22 |

FOREIGN PATENT DOCUMENTS

| | | |
|---|---|---|
| CN | 109254625 A | 1/2019 |
| CN | 209517294 U | 10/2019 |
| JP | H103586 A | 1/1998 |
| JP | 2002135630 A | 5/2002 |
| JP | 2008283562 A | 11/2008 |
| JP | 2020159149 A * | 10/2020 |
| KR | 101860227 B1 | 5/2018 |
| WO | 2019000410 A1 | 1/2019 |

\* cited by examiner

*Primary Examiner* — Jason K Gee
(74) *Attorney, Agent, or Firm* — Morgan, Lewis & Bockius LLP

(57) ABSTRACT

User authentication is performed using a camera to capture the user's identifying information (such as facial features) but the camera remains concealed until needed, thereby eliminating (or at least reducing) anxiety and privacy concerns. For example, the camera, when unneeded for authentication, may be hidden behind a retractable shutter or "smart" barrier that can change its state from translucent to transparent and vice versa.

26 Claims, 5 Drawing Sheets

UNOBTRUSIVE AUTHENTICATION SYSTEM

CROSS-REFERENCE TO RELATED APPLICATION

This application claims priority to and the benefit of, and incorporates herein by reference in its entirety, U.S. Provisional Patent Application No. 63/078,590, filed on Sep. 15, 2020.

FIELD OF THE INVENTION

In various embodiments, the present invention relates generally to authentication and, more specifically, to a camera-based technique for user authentication.

BACKGROUND

Personal identification and security checks represent an integral part of maintaining physical and data security in a wide variety of environments, such as healthcare. Numerous systems and methods exist for identifying an individual based on personal biometric information. Unlike biometric techniques such as fingerprint recognition and the like, image-based authentication approaches such as facial recognition base identification on unique bio-information but do not require bodily contact with a recognition apparatus or even cooperation on the part of the individual seeking entry; such authentication systems are therefore versatile and popular. Conventionally, cameras may be deployed near physical entry points or adjacent secure workstations to acquire the identifying information from personnel seeking access. Such configurations, however, may intimidate some individuals and raise privacy concerns for others. Accordingly, there is a need for systems that perform image-based user authentication in an unobtrusive manner.

SUMMARY

Various embodiments hereof provide approaches to user authentication using a camera to capture the user's identifying information (such as facial features) but which remains concealed until needed, thereby eliminating (or at least reducing) anxiety and privacy concerns. For example, the camera, when unneeded for authentication, may be hidden behind a retractable shutter or "smart" barrier that can change its state from translucent to transparent and vice versa. In various embodiments, once a triggering event for authentication occurs (e.g., upon detecting the presence of a user or receiving a first authentication factor such as a password, a user identifier, an utterance for voice analysis, etc. from the user), the camera is made operable (and therefore temporarily visible to the user) for a prescribed time interval so as to allow the user to authenticate using the camera-based technique (e.g., face recognition). In addition, after expiration of the prescribed time interval or after the user successfully authenticates himself (or fails to authenticate himself over a predetermined number of attempts), the camera may be concealed again until the next triggering event for authentication occurs.

Accordingly, the present invention allows the camera in a security system to be concealed most of the time (e.g., when unneeded for authentication) and become visible only when acquiring the user's identifying information for authentication. This unobtrusive system avoids unnecessary intrusiveness and potential non-compliance with authentication protocols.

As used herein, the term "temporary" refers to a period of time adequate or necessary to complete a user authentication. In addition, reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
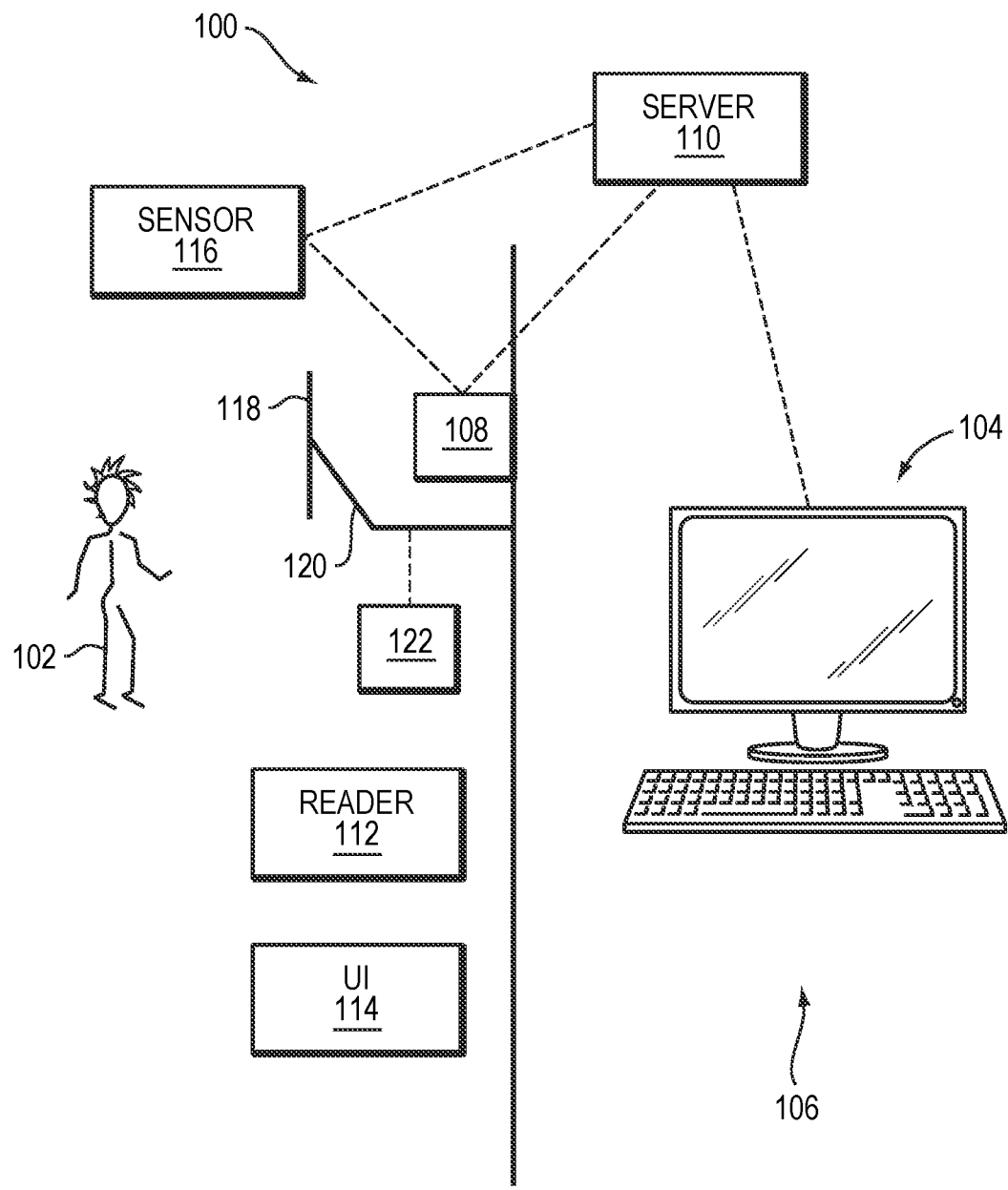
FIG. 1 schematically depicts an exemplary security system for performing user authentication in accordance with various embodiments of the present invention.

FIG. 1 depicts an exemplary security system 100 for authenticating a user 102 to permit access to a secure device (e.g., a computer or a medical device) 104, a restricted application (which may be accessed via an otherwise unsecured device) and/or a secure region 106 in accordance herewith. In various embodiments, the security system 100 includes a camera 108 for acquiring identifying visual information of the user (e.g., facial features and/or an arbitrary physical object ("trinket") chosen by or provided to the user), and a server 110 for processing the acquired images and, based thereon, authenticating the user. In addition, the security system 100 may include a reader 112 for reading and/or decoding identifying information provided by the user 102 for two-factor authentication. For example, the user may carry an identifying tag (e.g., a radio-frequency identification (RFID) tag, or a token with a bar code or a quick response (QR) code) or a mobile phone that can transmit the identifying information to the reader 112 via, for example, Wi-Fi LAN, Bluetooth wireless and/or near-field communications. Upon receiving and/or decoding the user-identifying information, the reader 112 may transmit this information to the server 110 to verify the user's identity. In one embodiment, the secure device 104 itself is capable of receiving identifying information from the user and transmitting the information to the server 110. Alternatively, the security system 100 or the secure device 104 may include a user interface 114 for receiving, for example, a personal identification number (PIN), a password, or a fingerprint from the user for authentication.

In one embodiment, the security system 100 includes a presence-detection sensor 116 (e.g., an infrared sensor, a heat sensor, a proximity sensor, a pressure sensor, an acoustic sensor, or a motion sensor) for detecting the presence of the user at the secure device 104 and/or the entry point of the secure region 106. The acoustic sensor may be, for example, a microphone, which detects user proximity by sound; the user may be required to utter a verbal command or statement, and analysis of the sound clip may identify the user and serve as the first authentication factor. Alternatively, the acoustic sensor may be sensitive to ultrasound frequencies and the user may be in possession of a wearable device that advertises its unique identifier using ultrasound over a limited spatial range; once again this modality can be used both to detect and identify the user as a first authentication factor.

Figure 2A:
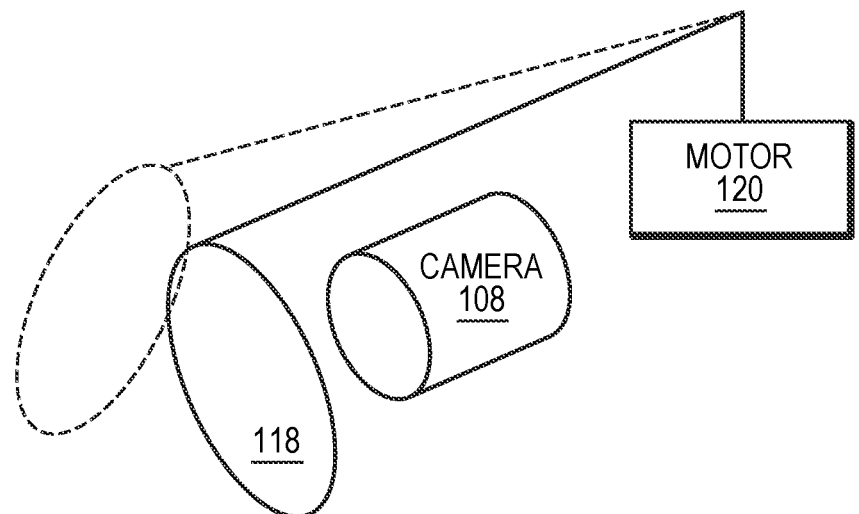
FIGS. 2A and 2B schematically depict exemplary shutters and a mechanism for concealing or exposing a camera in a security system in accordance with various embodiments of the present invention.
Figure 2B:
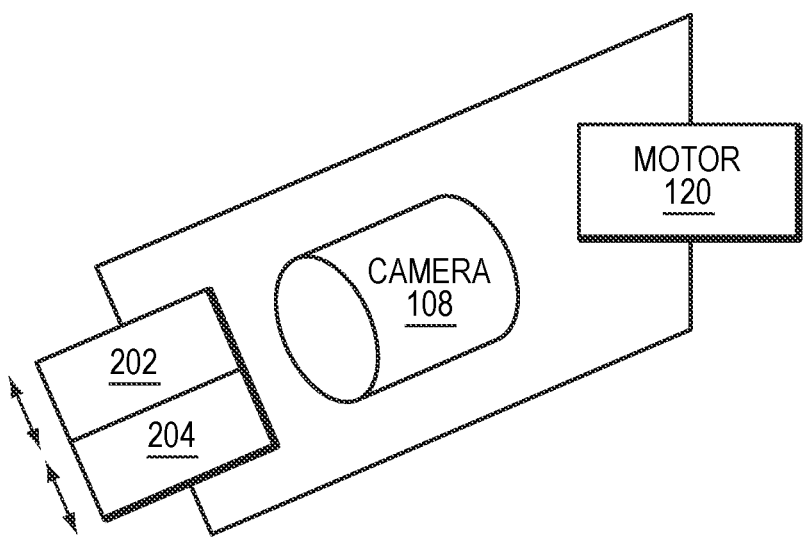

The user's presence may alternatively be detected using RF, e.g., by wireless communication with the user's trinket or mobile device. In addition, the camera 108 may be normally concealed (e.g., substantially invisible to the user) until a triggering event occurs (e.g., the user arrives at or approaches the secure device 104 and/or the entry point of the secure region 106). For example, following completion of user authentication and in the absence of a new triggering event, the camera 108 may be hidden behind a shutter or barrier 118. In some embodiments, the orientation (e.g., angle and/or position) of the shutter 118 can be controlled by an adjustment mechanism 120 (e.g., a motor, a gimbal, or other manipulator that permits mechanical adjustment of the position of the shutter 118). Upon detecting the presence or approach of a user, the sensor 116 may signal the adjustment mechanism 120 and/or the server 110 to change the orientation and/or position of the shutter 118 to reveal the camera 108 so that it may capture images of the user's identifying information (e.g., facial features or the trinket). For example, with reference to FIG. 2A, the adjustment mechanism 120 may physically rotate the shutter 118 around one or more axes so as to expose the lens of the camera 108 to the user. Alternatively, referring to FIG. 2B, the shutter 118 may include two panels 202, 204, and the adjustment mechanism 120 may open the panels 202, 204 (e.g., along slide rails) to expose the camera 108. In some embodiments, the adjustment mechanism 120 can further retract the panels 202, 204 behind the camera 108. After the camera 108 is revealed, the user may orient himself or the trinket to allow the camera 108 to obtain an image thereof for authentication.

Figure 2C:
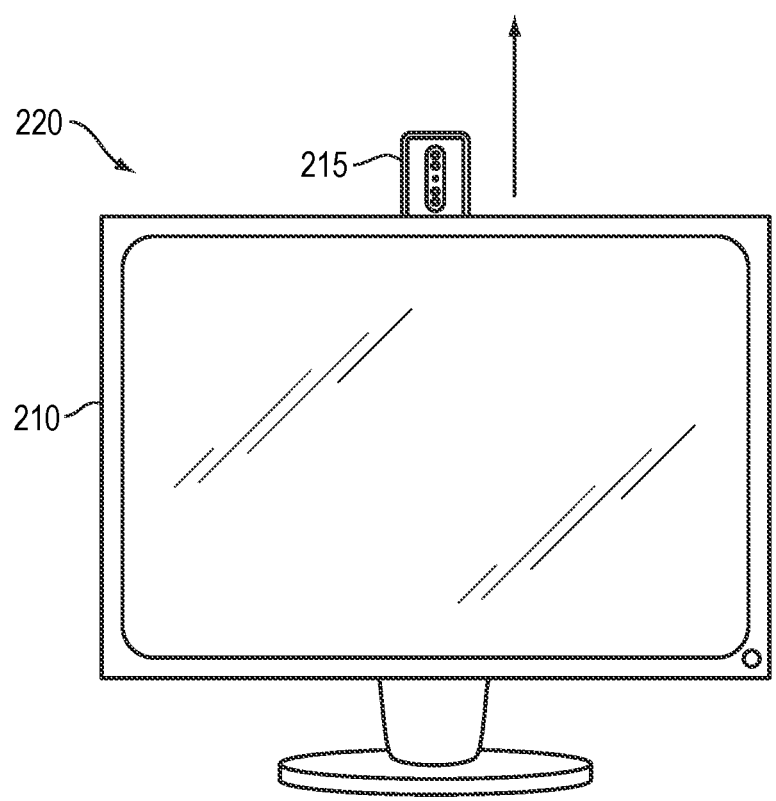
FIG. 2C schematically depicts components of an exemplary security system in accordance with various embodiments of the present invention.

Other arrangements not involving a shutter are possible. In one alternative, illustrated in FIG. 2C, the secure device 104 may have a conventional display screen 210 with which the user interacts via touch, voice, a keyboard, etc. A "pop-up" camera 215 is positioned behind the top of the display screen 210 and, when a user approaches the display screen 210, the adjustment mechanism 120 extends the camera upward (as indicated by the arrow) so that it is now visible to, and can acquire an image of, the user. The pop-up camera 215 may be quite small for convenient mounting and operation, and to avoid visual prominence.

Alternatively, a small camera 215 may be recessed within the volume of the display screen 210; when not in use, the top of the camera 215 is flush with (and preferably matches) the top edge 220 of the display screen 210. The adjustment mechanism 120 may be a motor that bidirectionally drives the camera 215 along a vertical track, exposing and retracting the camera as appropriate. Similarly, the camera may be rotated into position; for example, the camera may be disposed in a cylindrical housing that is rotated from a first position, in which the wall of the cylinder (which may visually match the front of the secure device 104) faces outward through a window in the secure device 104, to an operative position with the camera lens positioned in the window. Still other alternatives involve folding the camera mount.

Additionally or alternatively, the triggering event may be determined by a security policy and involve events other than presence detection. For example, the event triggering uncovering of the camera may be a request by a secondary application (or an external website or server in communication with the secure device 104) participating in multi-factor authentication of a user seeking access. This event may occur, for example, upon receipt of a first authentication factor from the user and determination that, for this user at this time, the security policy requires a secondary factor. In this case, the camera 108 may be concealed from the user until the user provides the first authentication factor to the reader 112, secure device 104 and/or user interface 114 and the need for a biometric factor is determined. The first authentication factor may be, for example, information in a tag or mobile phone, a PIN, a password, or a fingerprint. In one embodiment, upon receiving the first authentication factor, the receiving device (e.g., the reader 112, secure device 104 and/or user interface 114) determines whether biometric authentication is required and, if so, transmits a signal to the adjustment mechanism 120 to reveal the camera 108 and acquire images of the user and/or his trinket for authentication. The need for secondary authentication may also be based on analysis of a video feed from the vicinity of the secure device 104, e.g., if a user switch or the presence of an additional user is detected.

Similarly, the event triggering concealment of the camera 108 can be determined by a policy, i.e., the event may be something other than completion of authentication. For example, the camera 108 may be hidden upon departure of the user (as detected by the camera 108 as the user moves out of view, or by a video feed from surveillance cameras).

It should be noted that the approaches described above for revealing the camera are exemplary only; any other suitable approaches for adjusting the relative orientations between the shutter 118 and the camera 108 so as to conceal and expose the camera 108 can be employed and are thus within the scope of the present invention. In addition, the first authentication factor may be received/decoded by any suitable device and may include any information identifying the user. Further, upon receiving the first authentication factor, the receiving device (e.g., the identifying information reader 112 or user interface 114) may transmit a signal to the server 110, which can then confirm the validity of the first authentication factor. If the first authentication factor is verified, the server 110 can signal the adjustment mechanism 120 to reveal the camera 108 as described above. Similarly, the adjustment mechanism 120 may be controlled by the server 110 in response to signals from the sensor 116.

In other embodiments, the camera 108 is hidden behind a "smart" transparent barrier 118 whose light-transmission properties (e.g., opacity) can be altered by applying a voltage, light or heat thereto; in other words, the shutter need not be mechanical but can instead be optical. For example, the smart barrier may include or consist of an electrochromic material (e.g., tungsten oxide, $WO_3$) that is substantially opaque in the absence of a voltage; by "substantially opaque" is meant that the material is sufficiently untransmissive that a viewer cannot readily see the camera 108 through the activated material. In one embodiment, upon occurrence of the triggering event for authentication (e.g., detection of the user's presence and/or provision of the user's first authentication factor), the adjustment mechanism 120 may increase or decrease a voltage applied to the electrochromic material, thereby causing the smart barrier to switch its state from opaque to transparent. As a result, the camera 108 located behind the smart barrier can record an image of the user or the user's trinket for purposes of authentication. Alternatively, the smart barrier may include or consist of a micro-blind material having rolled thin metal blinds. With no voltage applied thereto, the metal blinds are rolled and allow light to pass; but upon application of a voltage, the rolled metal blinds stretch out and thus block light. In still another embodiment, the smart barrier includes or consists of a liquid crystal (LC, e.g., polymer-dispersed LC) shutter or light valve. Once again, increasing the applied voltage increases the material's opacity. Thus, in one embodiment, prior to occurrence of the triggering event for authentication, a voltage can be continuously applied to the micro-blind barrier or LC shutter to conceal the camera 108 therebehind. Upon occurrence of the triggering event, the circuit may be broken or the voltage reduced so as to make the barrier transparent.

It should be noted that the foregoing smart barrier technologies are exemplary only; other suitable materials (such as the photochromic material, thermochromic material, suspended particles, etc.) and their corresponding devices (e.g., a light source or a heat source) for switching the state of the barrier between substantially opaque and substantially transparent may be utilized and thus are within the scope of the present invention. In addition, the voltage, light, heat or other signal applied to the smart barrier may be controlled by the adjustment mechanism 120 and a voltage source, a light source or a heat source 122. For example, upon detecting the user's presence using the sensor 116 and/or receiving the first authentication factor using the identifying information reader 112 (and/or user interface 114), the server 110 may transmit a signal to the voltage source (or light or heat source) 122 to apply or stop applying the voltage (or other signal) to the smart barrier, thereby changing its state. In some embodiments, the adjustment mechanism 120 includes a switch (a MEMS switch or a CMOS switch) for controlling the application of the voltage (or other signal) from the voltage source (or other signal source) 122 to the smart barrier in response to the triggering event.

In various embodiments, the camera 108 is visible to the user for a prescribed interval long enough to allow the user to authenticate herself. For example, if the camera-based authentication utilizes the user's facial features, the user may be given 10 seconds to orient her face to the camera 108. In some embodiments, the security system 100 allows the user to choose the trinket for authentication. In this case, the user may be given a longer time (e.g., two minutes) to locate the trinket and present it to the camera 108. Upon expiration of the prescribed time interval, the camera 108 may be concealed from the user again by, for example, changing the position of the shutter and/or the state of the smart barrier 118. In some embodiments, after the camera 108 captures images of the user's identifying information (e.g., facial features or trinket), the camera 108 transmits the images to the server 110 for processing, and the server 110 thereupon attempts to verify the user's identity based on the transmitted images. If the user's identity is verified, the server 110 may grant access to the secure device 104 and/or secure region 106. If, however, the identity cannot be verified, the server 100 may not allow the user to access the secure device 104 and/or secure region 106.

In some embodiments, the camera 108 is visible to the user until the user successfully authenticates himself or fails to authenticate himself following a predetermined number of attempts (e.g., three). For example, upon verification by the server 110 of the user's identity based on the information provided by the camera 108, the server 110 may grant access to the user and then cause the adjustment mechanism 120 to hide the camera 108 again. This spares the user from time pressure.

Figure 3:
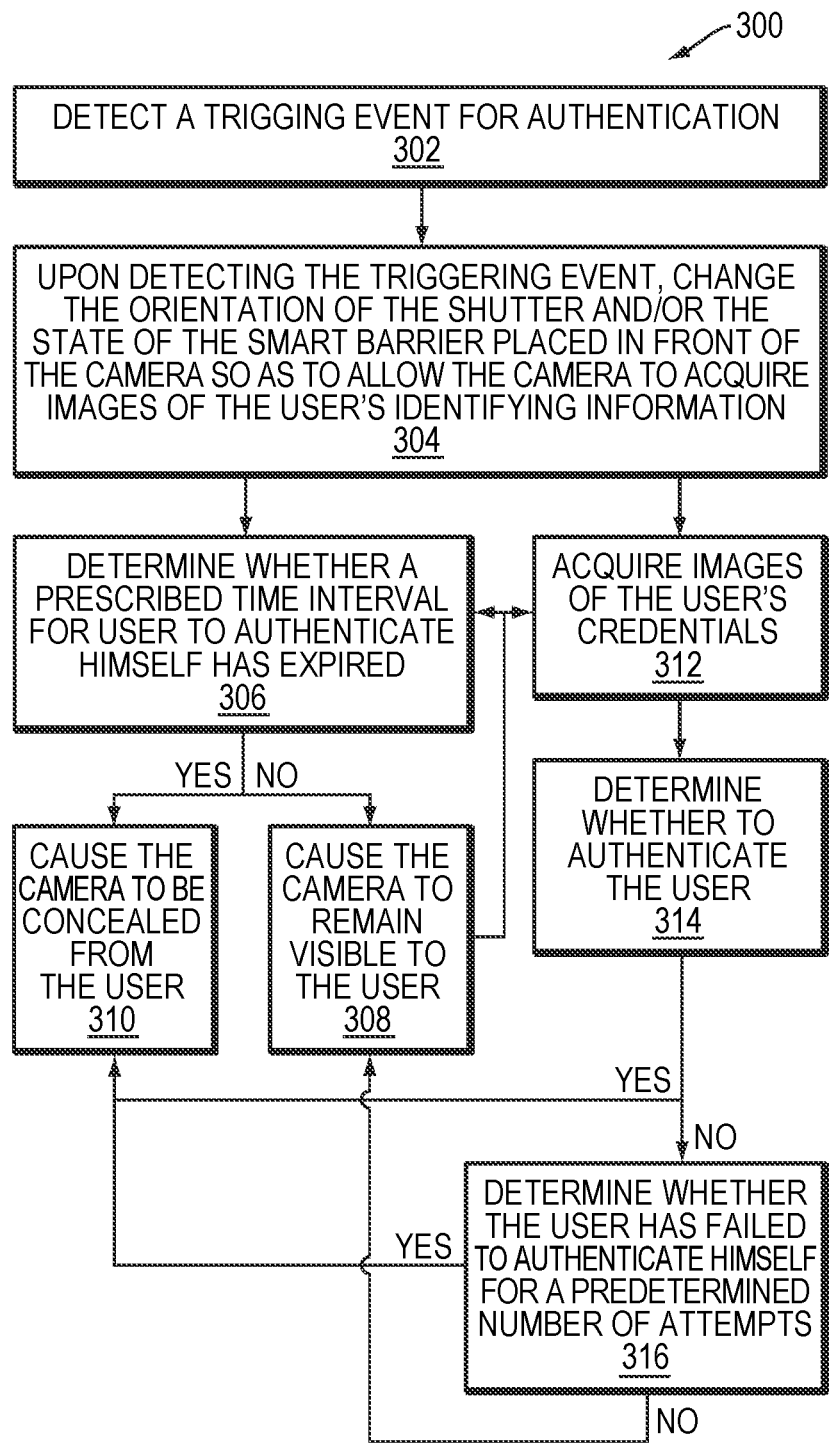
FIG. 3 is a flow chart of an exemplary approach for performing a camera-based authentication in accordance with various embodiments of the present invention.
Figure 4:
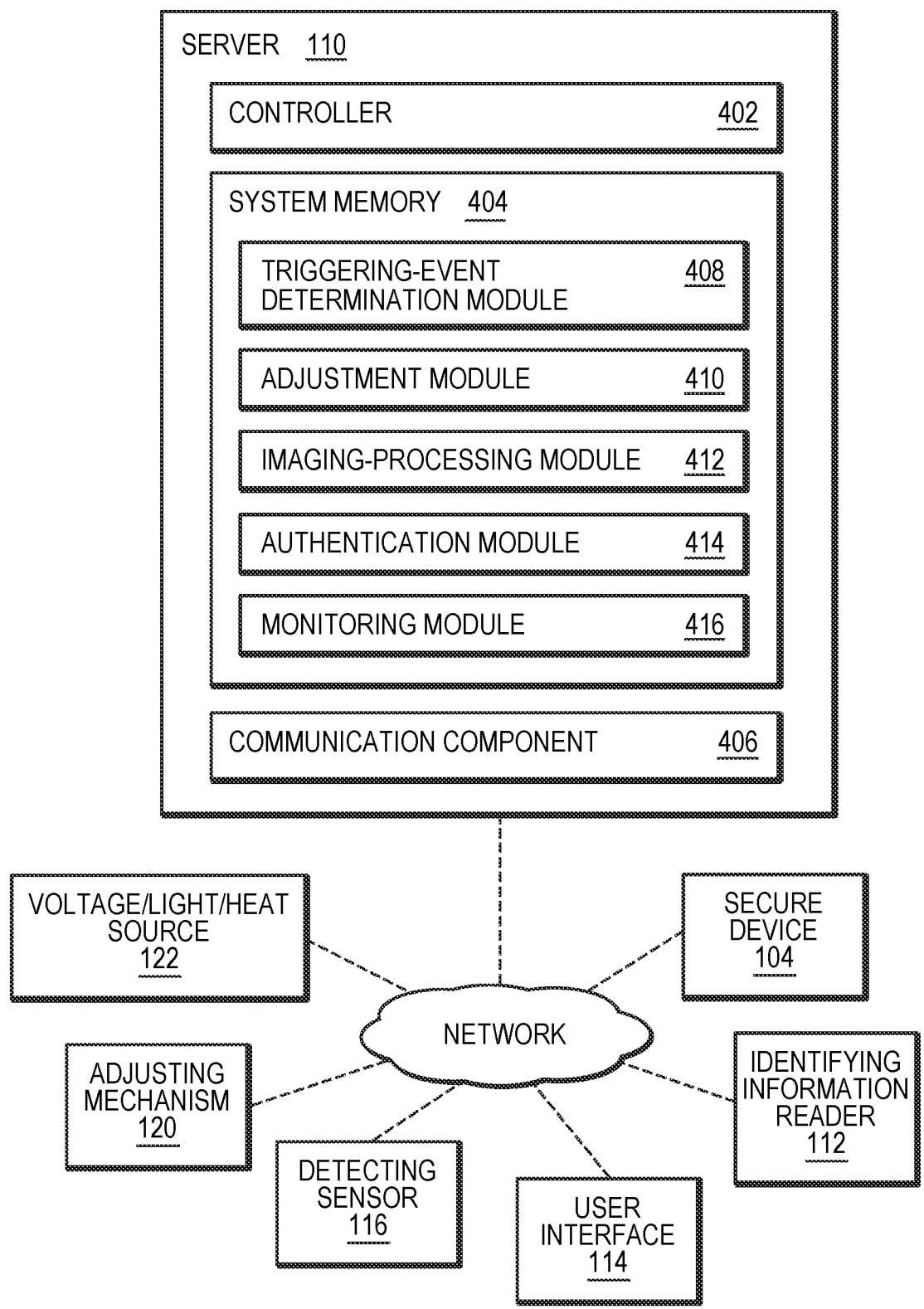
FIG. 4 schematically illustrates a server for performing a camera-based user authentication in accordance with various embodiments of the present invention.

FIG. 3 illustrates an exemplary approach 300 for authenticating a user using a camera-based technique. In a first step 302, the security system 100 is activated to detect a triggering event for authentication. For example, the sensor 116 may detect the presence of the user and the identifying information reader 112 and/or user interface 114 may receive the first authentication for the user. Prior to occurrence of the triggering event, the camera 108 utilized for performing the authentication is concealed behind the shutter or smart barrier 118. In a second step 304, upon detecting the triggering event, the adjustment mechanism 120 changes the orientation of the shutter and/or the state of the smart barrier 118 so as to allow the camera 108 to acquire images of the user's identifying information (e.g., facial features or a trinket). The camera 108 may be visible to the user for a prescribed time interval commensurate with the form of authentication. For example, the user may be accorded extra time to search for a trinket. In a third step 306, the security system 100 determines whether the prescribed time interval has expired. If not, the position of the shutter and/or the state of the smart barrier remains unchanged for the user to authenticate himself (step 308). If, however, the prescribed time interval has expired, the security system 100 causes the adjustment mechanism 120 to change the orientation of the shutter and/or the state of the smart barrier 118 so as to conceal the camera 108 from the user again (step 310). In some embodiments, when the camera 108 is revealed, the security system 100 causes the camera to acquire images of the user's credentials (e.g., facial features and/or trinket) (step 312), and based thereon determines whether to authenticate the user (step 314). If the user has successfully authenticated himself, the security system 100 causes the adjustment mechanism 120 to change the orientation of the shutter and/or the state of the smart barrier 118 to conceal the camera 108 again (step 310). Alternatively, if the security system 100 determines that the user has failed to authenticate himself after a predetermined number of attempts (e.g., three times) (step 316), the security system 100 causes the camera 108 to be concealed from the user (step 310). Otherwise, the security system 100 causes the camera to remain visible (step 308) so that the user may again attempt to authenticate FIG. 4 illustrates an exemplary server 110 in accordance with embodiments of the present invention. The server 110 includes a controller 402 and system memory 404 including instructions, conceptually illustrated as a group of modules, that control the operation of controller 402 and its interaction with the other hardware components. The controller 402 executes commands and instructions and may be a general purpose computer, but may utilize any of a wide variety of other technologies including a special purpose computer, a microcomputer, minicomputer, mainframe computer, programmed microprocessor, micro-controller, peripheral integrated circuit element, a CSIC (customer-specific integrated circuit), ASIC (application-specific integrated circuit), a logic circuit, a digital signal processor, a programmable logic device, such as an FPGA (field-programmable gate array), PLD (programmable logic device), PLA (programmable logic array), RFID processor, smart chip, or any other device or arrangement of devices that is capable of implementing the approaches described above. In addition, the server 110 may include a communication component 406 (e.g., a modem, a network interface or other communication mechanism) designed to provide communications with a network—such as the Internet and/or any other land-based or wireless telecommunications network or system—and, through the network, with other devices (such as the secure device 104, identifying information reader 112, user interface 114, presence-detection sensor 116, adjustment mechanism 120 and/or voltage, light or heat source 122).

The system memory 404 includes a triggering-event determination module 408 for recognizing occurrence of triggering events based on information received from the sensor 116, secure device 104, identifying information reader 112 and/or user interface 114; an adjustment module 410 for controlling the adjustment mechanism 120 so as to change the position of the shutter 118 and/or the state of the smart barrier; an image-processing module 412 for processing the images acquired by the camera 108; an authentication module 414 for determining whether the user's credentials, provided via the images acquired by the camera 108, entitle her to access the secure device 104 and/or secure region 106; and a monitoring module 416 for monitoring the user's authentication progress (e.g., how much time the user has taken for authentication). The various modules may be programmed in any suitable programming language, including, without limitation, high-level languages such as C, C++, C#, Ada, Basic, Cobra, Fortran, Java, Lisp, Perl, Python, Ruby, or Object Pascal, or low-level assembly languages; in some embodiments, different modules are programmed in different languages. As will be readily understood by a person of skill in the art, the computational functionality required to carry out authentication methods in accordance herewith may be organized (in software modules or otherwise) in many different ways, and the depicted embodiment in FIG. 4 is, therefore, not to be regarded as limiting. Further details regarding suitable configurations of the server 110 are provided, for example, in U.S. Pat. Nos. 8,973,091 and 9,246,902, the entire disclosures of which are hereby incorporated by reference.

In general, the terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A security system for a multi-factor authentication of a user, the system comprising:
   a camera for acquiring identifying information of a user, the camera being concealed from the user prior to occurrence of a triggering event for authentication, the triggering event comprising receipt of a first authentication factor from the user;
   adjustment means for causing the camera to be concealed from or revealed to the user; and
   a controller configured to:
   detect the triggering event and, only when the first authentication factor is verified, thereupon cause the adjustment means to reveal the camera to the user;
   acquire a second authentication factor by causing the camera to acquire images of the identifying information of the user; and
   based on the acquired identifying information, determine whether to authenticate the user.

2. The security system of claim 1, wherein the adjustment means is mechanical.

3. The security system of claim 2, wherein the adjustment means comprises a shutter and an adjustment mechanism for controlling relative orientations of the shutter and the camera.

4. The security system of claim 1, wherein the adjustment means is optical.

5. The security system of claim 4, wherein the adjustment means comprises (i) a barrier having a selectable opacity level and comprising at least one of an electrochromic material, a photochromic material, a thermochromic material, suspended particles, polymer-dispersed liquid crystals or metal blinds and (ii) a signal source for setting the opacity level of the barrier.

6. The security system of claim 1, wherein the triggering event for authentication further comprises presence of the user.

7. The security system of claim 1, wherein the triggering event for authentication is determined by a security policy.

8. The security system of claim 6, further comprising a presence-detection sensor including at least one of an infrared sensor, a heat sensor, a proximity sensor, a pressure sensor, an acoustic sensor, an RF sensor or a motion sensor for detecting the presence of the user.

9. The security system of claim 1, further comprising at least one of an identifying information reader or a user interface for receiving the first authentication factor from the user.

10. The security system of claim 1, wherein the first authentication factor comprises at least one of a personal identification number, a token, a password, a bar code, a quick response code, or a fingerprint.

11. The security system of claim 1, wherein the controller is further configured to:
    determine whether a predetermined time interval has expired; and
    upon determining that the predetermined time interval has expired, cause the adjustment means to conceal the camera from the user.

12. The security system of claim 1, wherein the controller is further configured to:
    upon determining authentication of the user, cause the adjustment means to conceal the camera from the user.

13. The security system of claim 1, wherein the controller is further configured to:
    following a predetermined number of unsuccessful authentication attempts, cause the adjustment means to conceal the camera from the user.

14. A method of performing a multi-factor authentication of a user, the method comprising:
    detecting occurrence of a triggering event for authentication, the triggering event comprising receiving a first authentication factor from the user;

only when the first authentication factor is verified, thereupon revealing to the user a camera previously concealed from the user prior to occurrence of the triggering event;

acquiring a second authentication factor from the user by causing the now-revealed camera to acquire images associated with identifying information of the user; and based on the acquired identifying information, determining whether to authenticate the user.

15. The method of claim 14, wherein revealing the camera to the user comprises adjusting relative orientations of the camera and a shutter located in front the camera so as to cause the camera to be visible to the user.

16. The method of claim 14, wherein revealing the camera to the user comprises applying a signal to a variable-opacity element that (i) comprises at least one of an electrochromic material, a photochromic material, a thermochromic material, suspended particles, polymer-dispersed liquid crystals or metal blinds and (ii) is disposed in front of the camera so as to cause the camera to be visible to the user at a low opacity level.

17. The method of claim 14, wherein the triggering event for authentication further comprises presence of the user.

18. The method of claim 14, wherein the triggering event for authentication is determined by a security policy.

19. The method of claim 17, further comprising detecting the presence of the user with at least one of an infrared sensor, a heat sensor, a proximity sensor, a pressure sensor or a motion sensor.

20. The method of claim 14, wherein receiving the first authentication factor from the user comprises causing at least one of an information reader or a user interface to receive the first authentication factor from the user.

21. The method of claim 14, wherein the first authentication factor comprises at least one of a personal identification number, a token, a password, a bar code, a quick response code, or a fingerprint.

22. The method of claim 14, further comprising:
determining whether a predetermined time interval for allowing the camera to be visible to the user has expired; and
upon determining that the predetermined time interval has expired, causing the camera to be concealed from the user.

23. The method of claim 14, further comprising:
upon authenticating the user, causing the camera to be concealed from the user.

24. The method of claim 14, further comprising:
following a predetermined number of unsuccessful authentication attempts, causing the camera to be concealed from the user.

25. The method of claim 14, wherein determining whether to authenticate the user comprises recognizing facial features of the user in the acquired images.

26. The method of claim 14, wherein determining whether to authenticate the user comprises recognizing, in the acquired images, a trinket selected by or provided to the user.

* * * * *